US009516043B2

(12) United States Patent
Nutkis

(10) Patent No.: US 9,516,043 B2
(45) Date of Patent: *Dec. 6, 2016

(54) AUDITOR SYSTEM

(71) Applicant: ZixCorp Systems, Inc., Dallas, TX (US)

(72) Inventor: Daniel Nutkis, Plano, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,515

(22) Filed: Oct. 23, 2014

(65) Prior Publication Data

US 2015/0047029 A1    Feb. 12, 2015

Related U.S. Application Data

(63) Continuation of application No. 12/470,079, filed on May 21, 2009, now Pat. No. 8,954,513, which is a continuation of application No. 10/407,832, filed on Apr. 3, 2003, now Pat. No. 7,539,725.

(51) Int. Cl.

| G06F 15/16 | (2006.01) |
| H04L 29/06 | (2006.01) |
| G06F 21/62 | (2013.01) |
| H04L 12/58 | (2006.01) |
| G06F 17/27 | (2006.01) |
| G06F 21/60 | (2013.01) |

(52) U.S. Cl.
CPC ....... *H04L 63/1408* (2013.01); *G06F 17/2705* (2013.01); *G06F 21/60* (2013.01); *G06F 21/6245* (2013.01); *H04L 12/585* (2013.01); *H04L 51/12* (2013.01); *G06F 2221/2101* (2013.01); *H04L 12/5885* (2013.01)

(58) Field of Classification Search
CPC .................. G06Q 10/107; G06F 21/60; G06F 2221/2101; H04L 12/5885
USPC ......................................................... 709/206
See application file for complete search history.

(56) References Cited

U.S. PATENT DOCUMENTS

| 5,963,965 | A | 10/1999 | Vogel |
| 5,999,932 | A | 12/1999 | Paul |
| 6,363,348 | B1 | 3/2002 | Besling et al. |
| 6,421,709 | B1 | 7/2002 | McCormick et al. |

(Continued)

FOREIGN PATENT DOCUMENTS

| CN | 1350246 A | 5/2002 |
| JP | 2000092114 A | 3/2000 |

(Continued)

OTHER PUBLICATIONS

Examination Report in Canadian Application No. 2,463,012, dated Nov. 16, 2009, 3 pages.

(Continued)

*Primary Examiner* — Phuoc Nguyen
(74) *Attorney, Agent, or Firm* — Fish & Richardson P.C.

(57) ABSTRACT

An auditing system and method for analyzing email, including capturing email transferred over a network and transferring the email to a data analyzer. The email can be encrypted for safe transfer to the analysis location. Once the email is delivered to the analysis location, it is decrypted and the analysis process begins. The analysis of the email includes scanning the email for specific search terms found in a lexicon and then identifying trends based on scanning results.

19 Claims, 4 Drawing Sheets

(56) References Cited

U.S. PATENT DOCUMENTS

| | | | |
|---|---|---|---|
| 6,647,383 B1 | 11/2003 | August et al. | |
| 6,718,367 B1 * | 4/2004 | Ayyadurai | H04L 12/585 370/260 |
| 6,816,885 B1 | 11/2004 | Raghunandan | |
| 7,461,403 B1 * | 12/2008 | Libenzi | H04L 63/145 709/224 |
| 7,526,809 B2 | 4/2009 | Liang et al. | |
| 7,539,725 B2 | 5/2009 | Nutkis | |
| 7,778,999 B1 | 8/2010 | Boisjolie et al. | |
| 8,321,348 B2 | 11/2012 | Frankel et al. | |
| 2002/0059382 A1 | 5/2002 | Yamaguchi et al. | |
| 2002/0059418 A1 | 5/2002 | Bird et al. | |
| 2002/0062368 A1 | 5/2002 | Holtzman et al. | |
| 2002/0103873 A1 | 8/2002 | Ramanathan et al. | |
| 2002/0147780 A1 * | 10/2002 | Liu | G06F 21/562 709/206 |
| 2002/0178228 A1 * | 11/2002 | Goldberg | H04L 12/58 709/206 |
| 2002/0198945 A1 * | 12/2002 | Thomas | G06F 21/606 709/206 |
| 2003/0078981 A1 * | 4/2003 | Harms | G06Q 10/107 709/206 |
| 2003/0110162 A1 | 6/2003 | Newman | |
| 2003/0131319 A1 | 7/2003 | Hintz | |
| 2003/0191689 A1 | 10/2003 | Bosarge et al. | |
| 2003/0200210 A1 | 10/2003 | Lin | |
| 2003/0233414 A1 | 12/2003 | Henry | |
| 2004/0091177 A1 * | 5/2004 | Eaton | G06F 21/62 382/311 |
| 2004/0133645 A1 | 7/2004 | Massanelli et al. | |
| 2004/0153515 A1 | 8/2004 | Toubal et al. | |
| 2005/0240939 A1 | 10/2005 | Motoyama et al. | |
| 2009/0228461 A1 | 9/2009 | Nutkis | |
| 2010/0211595 A1 | 8/2010 | Yamamoto et al. | |

FOREIGN PATENT DOCUMENTS

| | | |
|---|---|---|
| WO | WO 01/97089 A1 | 12/2001 |
| WO | WO 02/28123 A2 | 4/2002 |
| WO | WO 2004/003704 A2 | 1/2004 |
| WO | WO 2004/003704 A3 | 1/2004 |

OTHER PUBLICATIONS

Examination Report in Canadian Application No. 2,463,012, dated Aug. 8, 2012, 3 pages.

* cited by examiner

AUDITOR SYSTEM

CROSS-REFERENCE TO RELATED APPLICATIONS

This application is a continuation of U.S. application Ser. No. 12/470,079, filed May 21, 2009, which is a continuation of U.S. application Ser. No. 10/407,832, filed Apr. 3, 2003 (now U.S. Pat. No. 7,539,725). The disclosures of the prior applications are considered part of and are incorporated herein by reference.

TECHNICAL FIELD

This invention relates to data auditing.

BACKGROUND

In the information age, organizations of all types have come to rely heavily on electronic mail (email) for conducting business. Email allows a person to communicate, through a computer network, with anyone in the world quickly. This seemingly instantaneous communication enhances productivity within an organization as well as facilitates communication externally. Organizations communicate externally with, for example, clients, business partners, suppliers, distributors, accountants, and attorneys. These electronic communications have become vital to organizations.

However, one problem with the extensive use of email to conduct business is that email often contains confidential information. The disclosure of confidential information can lead to legal liability or result in both financially and reputation damage. Some examples of confidential information include government mandated confidential information, such as, health information protected under the Health Insurance Portability and Accountability Act or personal finance information as protected under the Gramm-Leach-Billey Act. In addition, there are numerous other forms of information that must be protected from disclosure to third parties, such as, attorney-client communications and trade secrets.

Usually, information contained in email is not securely encrypted before being transmitted, therefore creating a risk that confidential information could fall into unauthorized hands. Often information in an email is sent without much thought or concern placed on whether or not confidential information is contained therein. In general, organizations as a whole are unaware of both the nature and amount of confidential information being transmitted though their email systems. As a result, organizations are unable to develop effective and efficient strategies for dealing with the transmission of confidential information.

While it is possible to develop a system that securely encrypts all outgoing email, these systems reduce efficiency by devoting time and resources to encrypting email that does not contain any confidential information, and thus delay potentially time sensitive communications needlessly. Additionally, if all email is encrypted recipients require the ability to decrypt the email.

SUMMARY

In one implementation, the invention provides an auditing system and method for analyzing email. The method includes capturing email transferred over a network. The mail can be transferred to a data analyzer. The email can be encrypted for safe transfer to an analysis location. Once the email is delivered to the analysis location it is decrypted and the analysis process begins. The analysis of the email includes scanning the email for specific search terms found in a lexicon and then identifying trends based on scanning results.

The auditing system can be used to inform organizations regarding the nature and amount of confidential information passing though their email system. Analysis can be useful to an organization in developing policies and protocols for dealing with confidential information that are finely tailored to the specific email and users. A tailored solution results in less email delay, while at the same time protecting most confidential information from disclosure.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present invention provides a unique system and method for collecting email, scanning email, and analyzing these results to develop trend information. In the following detailed description, numerous specific details are set forth in order to provide a thorough understanding of the present invention. However, it will be apparent to one of ordinary skill in the art that these specific details need not be used to practice the present invention. Also, specific examples of networks, components, and formats are described below to simplify the present disclosure. These are, of course, merely examples and are not intended to limit the invention from that described in the claims. Additionally, in other circumstances, well known structures, materials, circuits, and interfaces have not been shown or described in detail in order not to unnecessarily obscure the present invention.

An auditing system and method is provided which allows for the scanning of collected email for terms defined in a specialized lexicon and analyzing the scanning results for trend information. Reports based on the analysis results allow clients to develop more effective email policies and procedures. In one implementation, the focus of the auditing system is to allow clients to identify email security vulnerabilities by determining trends based on an analysis of confidential information contained in email.

Email Collection

Figure 1:
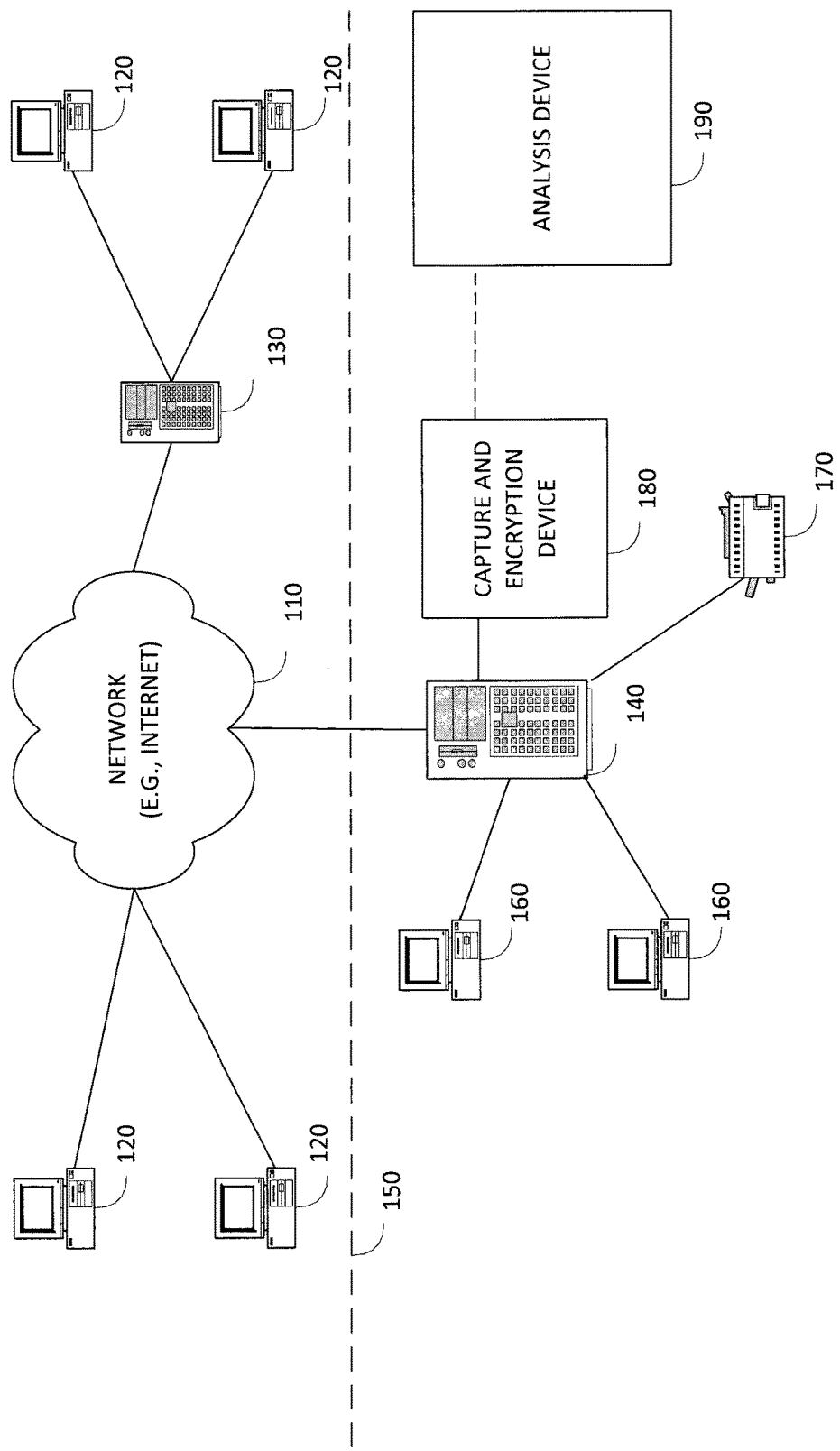
FIG. 1 is a diagram of a network including an email auditing system.

Referring now to FIG. 1, an example of a network architecture though which email, which includes data, can be collected is shown. A network 110 connects computers 120 allowing for the exchange of email between computers 120 either directly or though one or more servers 130. Networks exist on many different levels. Local Area Networks are often private networks protected by a firewall such as firewall 150. A firewall is used to prevent unauthorized access to a private network from computer systems that are part of a larger public network. An example of a Local Area Network is a network connecting computers within an office or company where the computer systems are all within close proximity of each other. Computers 160 and printer 170 reside on a private network connected to server 140.

Wide Area Networks are networks where the geographic separation between connected computer systems is greater. Wide Area Networks may be public or private. The Internet is an example of a public Wide Area Network. Network 110 represents a public network. Transmitting information though a public network is riskier than though a private network, because unauthorized persons may be able to access the transmitted information more easily.

Email often moves though the network 110 in order to transfer email from one computer to another. Server 140 is coupled to network 110 and includes a capture device 180 for use in the auditing system. Server 140 lies behind firewall 150 and is connected to many local network machines, such as computers 160 and printer 170. In this simplified implementation, all email outgoing from local network computers 160 must pass through server 140 in order to reach network 110 and further destinations, such as computer 120. Similarly, all incoming email must enter the local network from network 110 through server 140 and then can be accessed on local computer 160.

Capture device 180 is shown coupled to server 140. Email can be captured in several possible locations within a local network. For example, a local network may contain a separate mail server. In one implementation, there is no direct coupling of capture device 180 to analysis device 190 at the time of email capture. Analysis device 190 is shown in FIG. 1 to illustrate the ultimate destination for information captured by capture device 180.

In one implementation, once the capture of the email is complete, the email is physically transported to a remote site for analysis. The analysis process can involve several steps, including decrypting the email collected by the capture device, scanning the email, and determining trends based on the email.

The auditing system utilizes a capture device 180 to collect a copy of all email flowing in and out of a client network over a given period. This period will vary based on email volume and client considerations. In one implementation, the capture period is three working days. This allows for the analysis of a representative sample of email though the email system. Capture device 180 can take many different forms, including a data collector that can be used to copy email as it enters or leaves a computer network. The flow of email in and out of the client network can be nearly uninterrupted by the capture process. To ensure that the email is uninterrupted, the incoming and outgoing emails are unchanged by capture device 180. In another implementation, capture device 180 receives a collection of email already stored on client server 140. The email transferred to capture device 180 may only represent a selection of the overall email collected. This implementation results in a shorter capture time than the real-time capture method described above. In yet another implementation, only a ratio of the total amount of email transferred over the network is captured. For example, one email out of every 50 can be captured.

In a further implementation of capture device 180, the email is encrypted after capture for more secure storage. For simplicity, capture device 180 is described as performing both the storage and encryption, but separate devices can be used for storage and encryption. Furthermore, the encryption step may take place in concert with each copying of email or the email may be encrypted as a whole following completion of capture.

In one implementation, the email is encrypted with a randomly generated 168-bit (Triple-DES) symmetric key and the symmetric key is encrypted using a 1024-bit asymmetric encryption. The asymmetric key encryption system, also known as a public key encryption system, involves two keys, a public key and a private key. The public key is readily available to people for the purpose of encrypting email. However, only the private key may be used to decrypt the email once it has been encrypted using the corresponding public key. One example of asymmetric key encryption is RSA. In the present implementation, once the email is encrypted it can only be decrypted by an appropriate private key. Alternatively, the email can be encrypted using a symmetric key derived from a pass phrase.

In another implementation, instead of capturing email, documents captured by device 180 can be collected for analysis. A representative sample of documents are collected and encrypted by capture device 180 for transfer to the remote analysis site where the document text can be analyzed in a similar manner to the email.

Analysis

Figure 2:
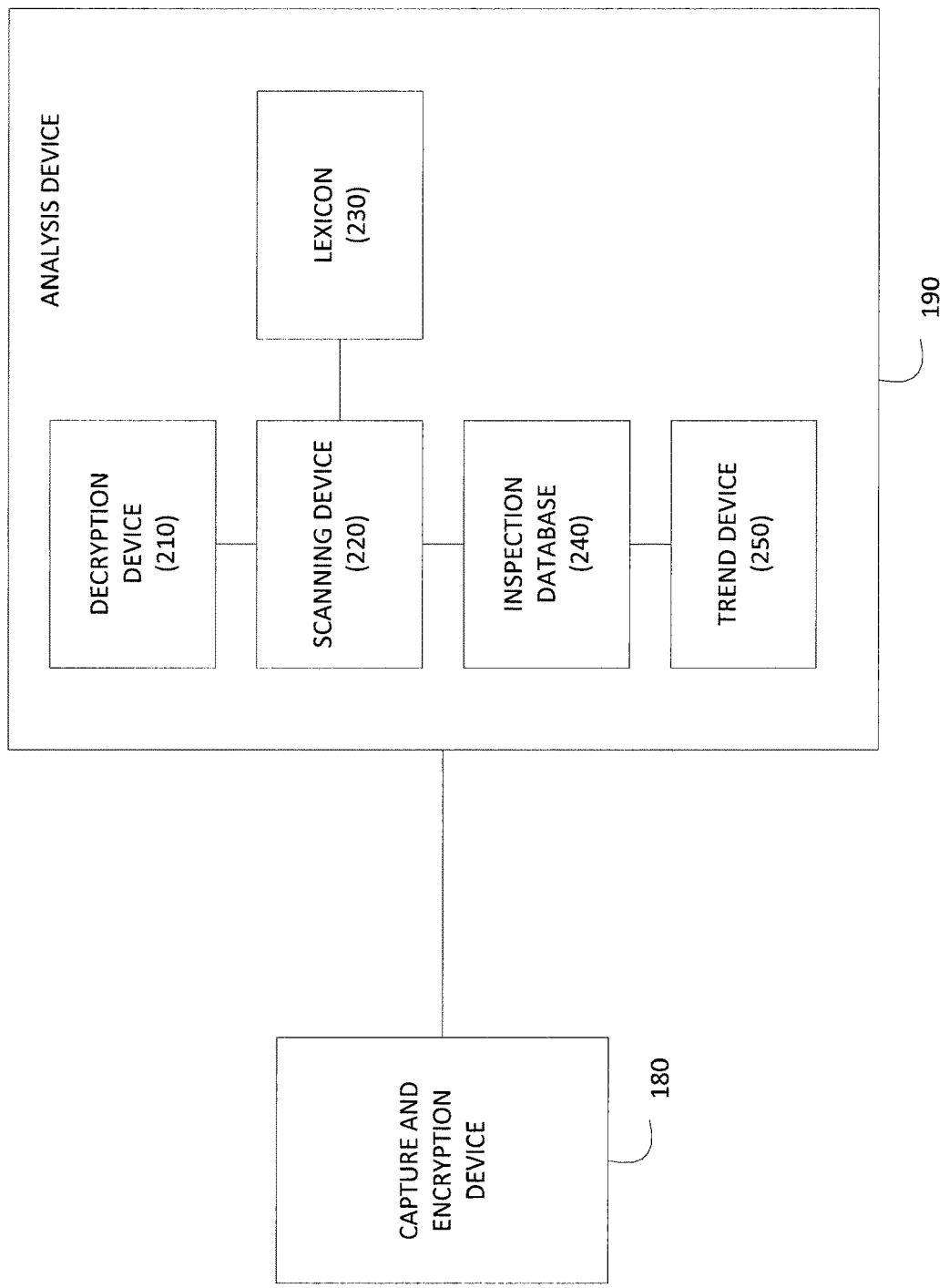
FIG. 2 is a diagram of one implementation of an analysis device.

Referring now to FIGS. 1 and 2, a detail view of analysis device 190 is shown. Analysis device 190 can be a self-contained unit. Encrypted email from capture device 180 is transferred to decryption device 210. Decryption device 210 uses the private key corresponding to the public key to recover the symmetric key encrypted by the public key. Decryption device 210 then uses the symmetric key to decrypt the email. The resultant decrypted email can then be evaluated by scanning device 220.

Scanning device 220 scans each email for terms, expressions, and masks defined in lexicon 230. In one implementation, the scanning device 220 scans both email headers and text as well as attachments. The scanning method is described further below in association with FIG. 3. Lexicon 230 contains a set of keywords, phrases, and expressions that are associated with confidential information. Additionally, lexicon 230 can be modified to suit the specific needs of the client for example, by including additional search terms. The structure of lexicon 230 is discussed further below with regard to FIG. 4. Analysis device 190 includes inspection database 240, which stores results of the scan, and trend device 250, which derives trends based on the results deposited into inspection database 240.

Scanning

Figure 3:
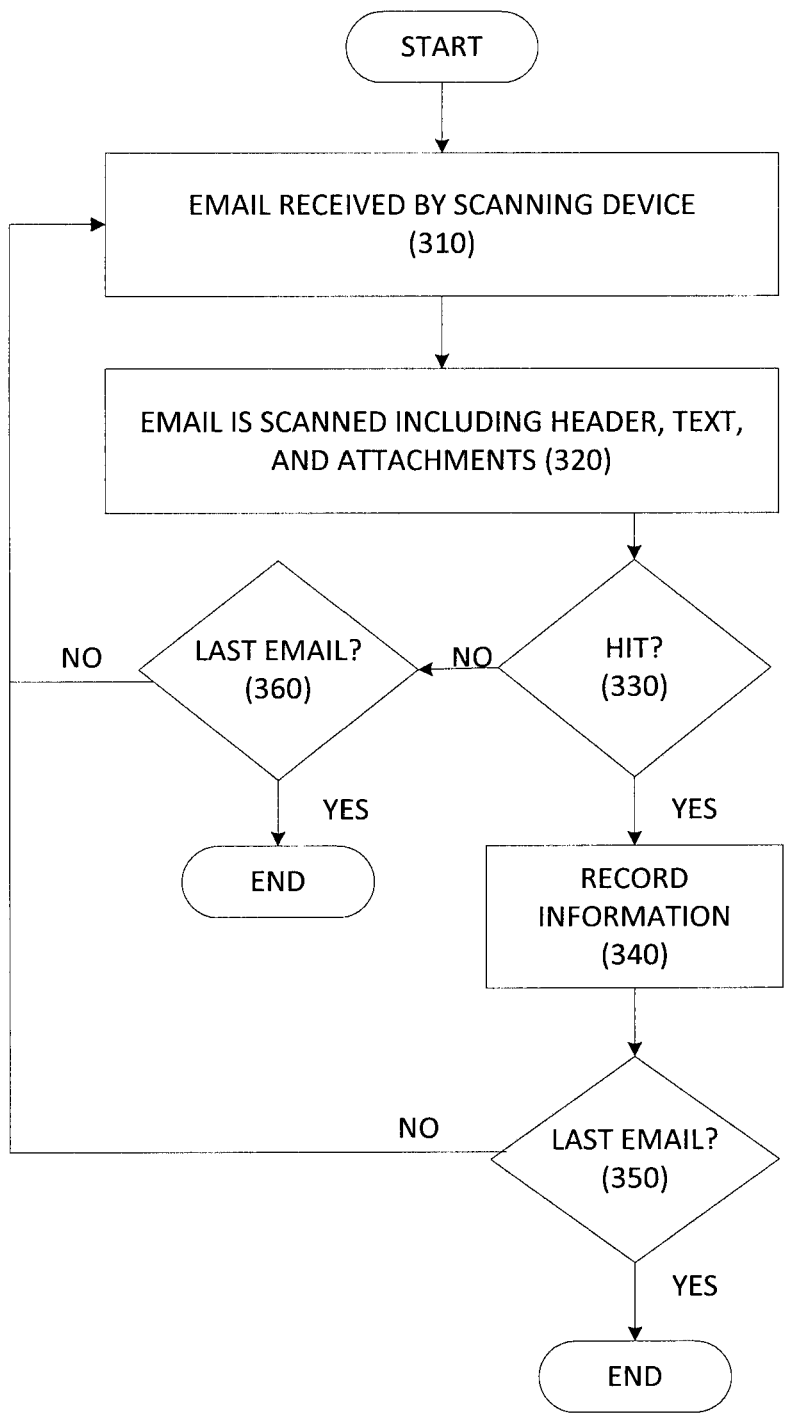
FIG. 3 is a flowchart describing the email scanning process.

Referring now to FIGS. 2 and 3, a scanning method for email is shown. In one implementation, a software application performs the email scanning. The process begins when an email is selected for scanning by the scanning device 220 (step 310). The email is then scanned by scanning device 220 (step 320). Scanning includes searching for keywords, expressions, phrases, or masks that correspond to items in lexicon 230. For example, the scan can be used to find instances where an email refers to an individual's Social Security Number. In one implementation, only the text of the email is scanned. In another implementation, additional parts of the email are scanned, including the email headers and attachments. The header of an email includes the "To", "From", and "Subject" fields of an email. The headers can be scanned for confidential information that is referenced in the subject line. The header also provides domain information, which is valuable for tracking who has sent confidential information and to whom.

Attachments are files that are often transmitted with the email. Attachments are a useful way to send files such as word processing documents, because the formatting is preserved and others can easily access the file. For example, documents created using Microsoft® Word can be attached to an outgoing email as a Word document. The recipient can then view the file using Microsoft® Word preserving all the document formatting. Since attachments are often in the form of documents that may contain confidential information, it is important that they are scanned. Some types of attachment files, such as a PDF file or a document that has been converted to an image, may not contain any recognizable original text. If the attachment can be converted to a type containing recognizable text, the converted attachment can be scanned for confidential information. Even if the file is not in a recognizable format, the file is scanned in case recognizable text can be identified. If the attachment is a compressed archival file with a known compression format, such as a zip file, the file may be decompressed into original files so that the original files can be scanned.

Scanning device 220 must then determine whether a lexicon term was found within the email. If there is a hit (the "YES" branch of step 330), the application records information (step 340) about the hit in, for example, inspection database 240. In one implementation, a hit is defined as an instance when scanning device 220 determines that the email contains a term found in lexicon 230. In one implementation, information about the type of hit can be stored, including the category and subcategory of the term discovered from lexicon 230, but the actual confidential information is not stored. For example, if a scan reveals that an email contains a Social Security Number, information is recorded about the type of term found (a Social Security Number) but the actual number itself is not recorded. In another implementation, the actual content information is stored. In yet another implementation, scanning device 220 records not just the type of hit made by the scan, but also the domain information, so that information regarding the email sender and recipient can be collected. If the email with the hit recorded is the last email (the "YES" branch of step 350), the scanning process ends. If there is more email (the "NO" branch of step 350), the scanning process returns to step 310.

If there is no hit in an email (the "NO" branch of step 330), the scanning process determines whether the scanned email was the last email (step 360). If there is another email (the "NO" branch of step 360), the scanning process returns to step 310. If there is no more email (the "YES" branch of step 360), the scanning process ends. If more than one hit is in an email, then the details of each hit are recorded.

Lexicon

Figure 4:
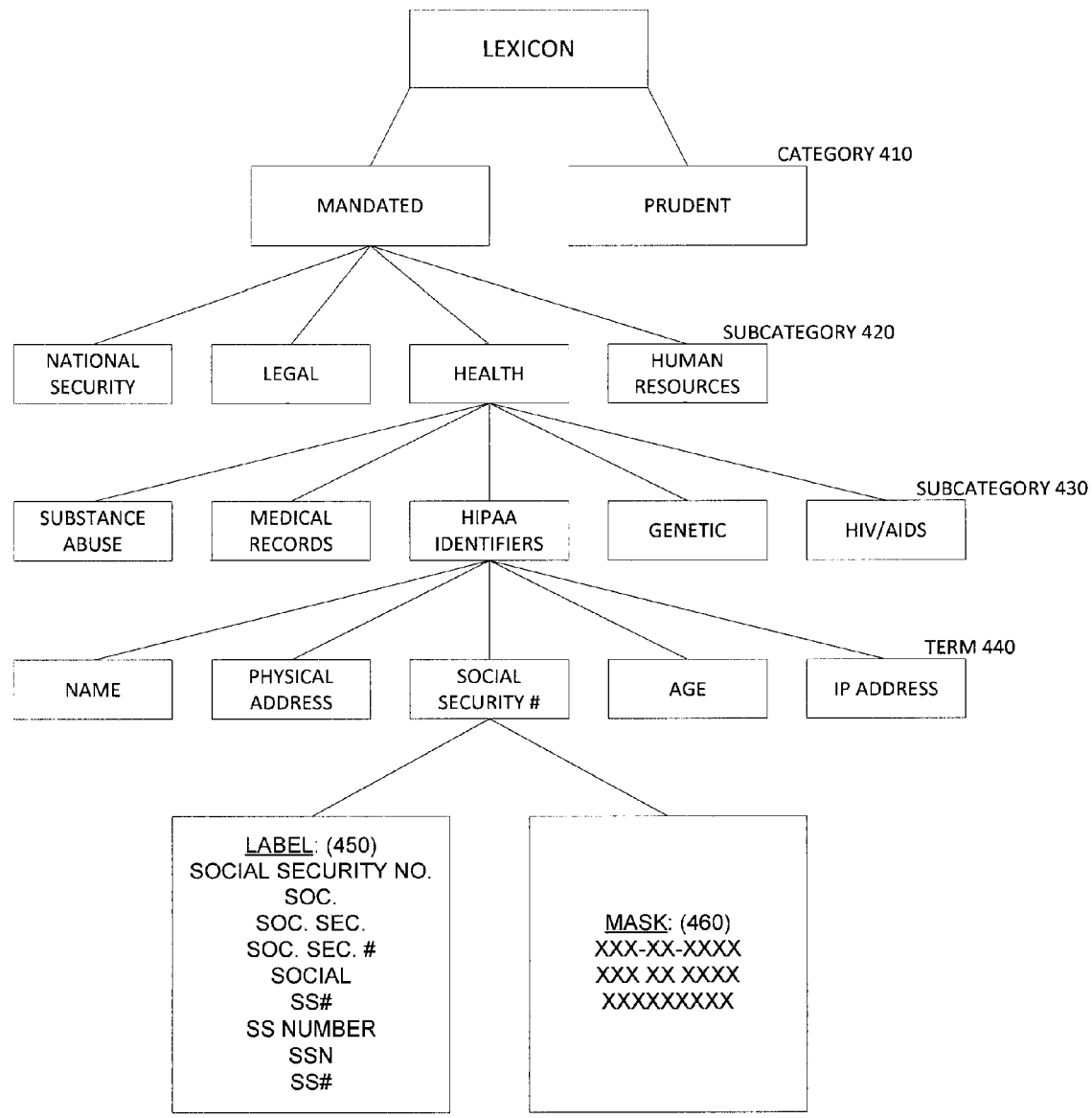
FIG. 4 shows a format of a lexicon.

Referring now to FIG. 4, an example of lexicon 230, which includes a hierarchy with multiple levels, is shown. The first level of the hierarchy includes general categories 410 that are divided into subcategories 420 at the next level. Subcategories 420 may be subdivided further at the next level into second subcategories 430. Second subcategories 430 are then parsed by specific search terms 440. Each search term has an associated set of labels 450 and masks 460. Scan results can be described in both broad and narrow terms based on different levels of the lexicon hierarchy. The hierarchy of the lexicon 230 allows the description of search results based on different levels, which represent different levels of specificity of confidential information. Lexicon 230 can include any number of levels in its hierarchy.

An example lexicon 230 is subdivided into two categories 410, mandated and prudent confidential information. Mandatory confidential information includes information which must be protected by law. Prudent confidential information includes information which is protected for business and legal reasons. Each category 410 can then be subdivided into multiple subcategories 420.

Found at subcategory level 420 are different areas of information which fall under the broad mandatory category. For example, subcategories 420 cover areas such as national security, legal, health, and human resources information. This first set of subcategories 420 begins the narrowing process leading to specific search terms.

Each subcategory 420 may include another hierarchy of second subcategories 430. For example, the health information subcategory 420 can include a number of second subcategories 430, such as substance abuse, medical record, Health Insurance Portability and Accountability Act (HIPAA) identifier, genetic, and HIV/AIDS information. These second subcategories 430 then include a number of specific search terms 440. For example, under HIPAA identifiers can be found several possible search terms 440, such as name, physical address, Social Security Number, age, and IP address. Each term 440 then is associated with a set of labels 450 and masks 460, which are used in the scanning process to find different variations of the same search term 440.

Taking the example term of "Social Security Number", there are several different labels that are associated with the search term "Social Security Number". A label is a predefined alternative to the terms which, when found in a scan, are treated as if the lexicon term itself was found. Labels that may be used as search items for the term "Social Security Number" include: Social Security Number, Soc. Sec. #, SS#, and SSN. By including these labels, a scan is more likely to find a hit of a Social Security Number within an email.

Additionally, using masks expands the likelihood of discovering a lexicon term. A mask is a type of filter that is used to include or exclude values based on some criteria. Again, using the case of a Social Security Number as an example, there are several different masks that may be used to discern the different ways in which the actual numbers themselves may be provided. Since the actual numbers themselves are irrelevant, a mask that looks for any numbers in certain nine digit formats is used, such as: XXX-XX-XXXX, XXX XX XXXX, and XXXXXXXXX. Note that each "X" represents a digit from 0-9. The mask does not care what number is actually present, the mask just looks at the format of the number string for a match. The use of a mask again enhances the ability to discover the desired lexicon term during an email scan containing such confidential information.

Lexicon 230 can include be a general set of keywords, expressions, and phrases for a given type of search, such as a search for terms relating to confidential information. However, lexicon 230 can also be custom designed to meet the needs of a specific client. This generally involves generating new search terms not found in the general lexicon, but important to the client. For example, if a client wants to know how often a product, such as a widget, is mentioned over email, the term "widget" can be added to the lexicon under an appropriate category and subcategory setting. Consequently, when the scan is run on captured email and "widget" is found, it will be recorded as a hit in the same manner as described above.

In one implementation, the record of each hit is placed in an inspection database. The inspection database provides information about each email containing a hit so that trends can be analyzed.

Trend Analysis

Referring again to FIG. 2, trend device 250 can be a separate physical object. Trend device 250 can, like the scanning device 220, be a software application that is applied to the collection of email recorded during the scanning process. Trend device 250 performs several functions, including determining the nature and amount of confidential information passing though a client's email system. Several examples of ways in which the information can be analyzed follow.

Information can be provided regarding a comparison of the categories and subcategories of the terms discovered in the email, giving a client an idea of the types of information passing though their email system. For example, a client may learn that 60% of the confidential information being sent through email falls in the mandated category. Furthermore, of that 60% perhaps half is from the health subcategory, 85% dealing with medical records. In another example, scanning may reveal small levels of confidential information related to age, address, and Social Security Number, that all are contained within the same subcategory of HIPAA Identifiers. Therefore, this analysis provides the clients with information about the types of confidential information at several levels of specificity gives a clearer picture of the email entering or exiting the systems. Trend device 250 can thus be useful to clients to develop carefully tailored email encryption protocols.

Information can also be analyzed based on category and domain. For example, it may be determined though analysis that 40% of all medical record information is sent between two particular parties. Thus, when most of the email from one person to another is confidential in nature, say from an employee to an insurance company, the system can be configured to encrypt every email sent by that employee to the insurance company. Analysis can also be focused on the destination domain of the confidential information, regardless of the sender. Comparisons can then be made of the types of confidential information going to different specific domains.

Further, information regarding the type of files containing the confidential information be analyzed. For example, perhaps most of the confidential information is being transmitted though attached Microsoft® Word documents. If this is the case, the client can develop better strategies for dealing with transmissions containing attached Microsoft® Word documents.

It is understood that the preceding analysis features are designed to illustrate the types of trend analysis that can be performed based on the types of information recorded following a representative capture and scan of all email. Some features of the disclosure will be used without corresponding use of other features. Furthermore, additional features may be employed without changing the operation of the present invention. Accordingly, it is appropriate that the appended claims be construed broadly and in a manner consistent with the disclosure.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

What is claimed is:

1. A method comprising:
   receiving, at a data analyzer, captured content over a network, the captured content comprising documents including potential attorney client protected information, personal information, custom information or confidential information;
   analyzing the captured content including:
      scanning the captured content for a set of keywords, phrases or expressions that are associated with potential attorney client protected information, personal information, custom information or confidential information, and
      recording information about hits that are determined based on the scanning, wherein recording further includes storing information that describes the hits;
   determining the nature of protected, personal, custom or confidential information in the documents including evaluating the recorded information, wherein the keywords, phrases or expressions are associated with respective categories and subcategories of information, and wherein determining the nature of the information in the documents comprises assigning to the documents the categories and subcategories of each of the hits in the documents that were determined based on the scanning; and
   providing information about the nature and amount of protected, personal, custom or confidential information in the documents, wherein the information includes trend analysis based on a comparison of the number of hits associated with each of the categories and subcategories.

2. The method of claim 1 where receiving the captured content includes copying the captured content for analysis.

3. The method of claim 2 wherein receiving the captured content includes receiving a sampling of the captured content.

4. The method of claim 2 wherein receiving the captured content includes receiving a selected ratio of all the captured content.

5. The method of claim 2 further comprising encrypting the captured content and decrypting the encrypted content before analysis.

6. The method of claim 1 wherein the captured content is email, and wherein receiving the captured content includes receiving or retrieving email that has been stored on an email server.

7. The method of claim 6 wherein the captured content is email and receiving the captured content includes receiving a ratio of email that is stored in the email server.

8. The method of claim 6 wherein receiving the captured content includes receiving a ratio of email that is transferred over a network.

9. The method of claim 1 wherein the keywords, phrases or expressions include one or more terms and the method further comprising receiving terms that describe the custom information, using the received terms when scanning, wherein the custom information is product information, and wherein the determining and providing the nature of protected, personal, custom or confidential information in the documents includes determining and providing information about occurrences of product information in the documents.

10. The method of claim 9 wherein the product information is a product name or identifier.

11. The method of claim 1 wherein the personal information is protected health or financial information.

12. The method of claim 1 further comprising configuring a client based information transmission system based on the provided information.

13. The method of claim 1 wherein storing information includes storing a type of hit.

14. The method of claim 1 wherein scanning the captured content includes one or more of documents, messages, or emails.

15. The method of claim 1 wherein analyzing the captured content includes:
   identifying one or more categories of the confidential information; and
   storing the identified categories of confidential information without storing actual confidential information after locating a hit.

16. The method of claim 1 wherein:
   the keywords, phrases or expressions have an associated mask, the mask being a filter used to include or exclude values from the keywords, phrases or expressions based on a predefined criteria; and
   analyzing the captured content includes searching the content for both the keywords, phrases or expressions and the associated mask.

17. The method of claim 1 wherein the keywords, phrases or expressions form a search query.

18. The method of claim 1 wherein the keywords, phrases or expressions include one or more terms and the method further comprising receiving terms that describe the custom information, using the received terms when scanning, wherein the custom information is or relates to a trade secret, and wherein the determining and providing the nature of protected, personal, custom or confidential information in the documents includes determining and providing information about occurrences of trade secrets in the documents.

19. The method of claim 1 wherein scanning includes scanning attachments to the captured content.

* * * * *